US007548922B2

(12) United States Patent
Altaf et al.

(10) Patent No.: US 7,548,922 B2
(45) Date of Patent: Jun. 16, 2009

(54) CUSTOMIZED AND CONSOLIDATED BOOKMARKS

(75) Inventors: Faheem Altaf, Pflugerville, TX (US); Kumar Ravi, Cedar Park, TX (US); Eric S. Rybczynski, Round Rock, TX (US); Manuel Silveyra, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 11/130,547

(22) Filed: May 17, 2005

(65) Prior Publication Data

US 2006/0265381 A1    Nov. 23, 2006

(51) Int. Cl.
G06F 17/30 (2006.01)
G06F 17/00 (2006.01)
G06F 15/16 (2006.01)

(52) U.S. Cl. .............................. 707/10; 707/1; 715/206; 709/206

(58) Field of Classification Search ..................... 707/1, 707/10; 715/206, 216; 709/206
See application file for complete search history.

(56) References Cited

U.S. PATENT DOCUMENTS

| | | | | |
|---|---|---|---|---|
| 6,269,369 | B1 * | 7/2001 | Robertson | 707/10 |
| 6,546,393 | B1 * | 4/2003 | Khan | 707/10 |
| 6,557,028 | B2 * | 4/2003 | Cragun | 709/205 |
| 6,578,072 | B2 * | 6/2003 | Watanabe et al. | 709/217 |
| 6,631,496 | B1 * | 10/2003 | Li et al. | 715/200 |
| 6,677,968 | B1 * | 1/2004 | Appelman | 715/853 |
| 6,750,881 | B1 * | 6/2004 | Appelman | 715/733 |
| 6,968,179 | B1 * | 11/2005 | De Vries | 455/414.1 |
| 7,353,252 | B1 * | 4/2008 | Yang et al. | 709/204 |
| 7,454,709 | B1 * | 11/2008 | Appelman | 715/733 |
| 2003/0097463 | A1 * | 5/2003 | Kageyama et al. | 709/237 |
| 2004/0111423 | A1 | 6/2004 | Irving et al. | 707/100 |
| 2004/0117355 | A1 | 6/2004 | Lef et al. | 707/3 |
| 2004/0122692 | A1 | 6/2004 | Irving et al. | 705/1 |
| 2004/0225716 | A1 * | 11/2004 | Shamir et al. | 709/204 |
| 2004/0230572 | A1 * | 11/2004 | Omoigui | 707/3 |

(Continued)

FOREIGN PATENT DOCUMENTS

JP     2003157279 A    5/2003

OTHER PUBLICATIONS

Mikihiko Mori and Seiji Yamada "Bookmark-Agent Sharing of Bookmarks for Search Assists", Systems and Computers in Japan, vol. 33, No. 4, 2002. 2002 Wiley Periodical, Inc. p. 69-76.*

(Continued)

*Primary Examiner*—John E Breene
*Assistant Examiner*—Robert Stevens
(74) *Attorney, Agent, or Firm*—Yee & Associates, P.C.; Matthew W. Baca

(57) ABSTRACT

A method, apparatus, and computer program product are provided for customizing and consolidating bookmarks into folders in an Instant Messaging (IM) environment as well as an Internet browser. An IM GUI is provided that contains IM contacts and online information for those IM contacts, such as Web searches or bookmarks, which can be accessed by the user. Sorting of the IM contacts by a specific subject matter or category is provided as well as prioritizing of IM contacts based on subject matter expertise or frequently visited bookmarks. Searching of information contained in the IM environment as well as the Internet is also provided.

20 Claims, 7 Drawing Sheets

U.S. PATENT DOCUMENTS

| | | | |
|---|---|---|---|
| 2004/0231003 A1* | 11/2004 | Cooper et al. | 725/135 |
| 2005/0021520 A1* | 1/2005 | Neilsen et al. | 707/9 |
| 2005/0021780 A1* | 1/2005 | Beyda | 709/229 |
| 2005/0080859 A1* | 4/2005 | Lake | 709/206 |
| 2005/0203801 A1* | 9/2005 | Morgenstern et al. | 705/14 |
| 2005/0210396 A1* | 9/2005 | Galli | 715/758 |
| 2005/0256866 A1* | 11/2005 | Lu et al. | 707/5 |
| 2005/0262052 A1* | 11/2005 | Daniels et al. | 707/3 |
| 2006/0101119 A1* | 5/2006 | Qureshi et al. | 709/206 |
| 2006/0123084 A1* | 6/2006 | Heidloff et al. | 709/206 |
| 2006/0167991 A1* | 7/2006 | Heikes et al. | 709/204 |
| 2006/0206480 A1* | 9/2006 | Heidloff et al. | 707/6 |
| 2007/0067297 A1* | 3/2007 | Kublickis | 707/9 |
| 2007/0081197 A1* | 4/2007 | Omoigui | 358/403 |
| 2008/0027909 A1* | 1/2008 | Gang et al. | 707/3 |
| 2008/0141117 A1* | 6/2008 | King et al. | 715/238 |

OTHER PUBLICATIONS

Mori et al., "Bookmark-Agent: Sharing of Bookmarks for Search Assists", May 2000, pp. 69-76.*

"Guide to WebSphere Portal 5.0", IBM Corporation, © 2003, pp. 1-79.*

Truong, Khai Nhut, et al., "Vicariously Sharing Captured Web Experiences", GVU Technical Report GIT-GVU-02-26, Georgia Institute of Technology, © 2002, pp. 1-8.*

Yee, Susan, et al., "StudioBRIDGE: Using Group, Location and Event Information to Bridge Online and Offline Encounters for Co-Located Learning Groups", CHI 2005, Portland, OR, Apr. 2-7, 2005, pp. 551-560.*

Goecks, Jeremy, et al., "NuggetMine: Intelligent Groupware for Opportunistically Sharing Information Nuggets", IUI '02, San Francisco, CA, Jan. 13-16, 2002, pp. 87-94.*

Lund, Ben, et al., "Connotea: A Free Online Reference Management Service for Scientists", D-Lib Magazine, vol. 11, No. 3, Mar. 2005, pp. 1-12.*

Kanawati, Rushed, et al., "A Multi-Agent System for Collaborative Bookmarking", AAMAS '02, Bologna, Italy, Jul. 15-19, 2002, pp. 1137-1138.*

Lund, Ben, et al., "Social Bookmarking Tools (II): A Case Study—Connotea", D-Lib Magazine, vol. 11, No. 4, Apr. 2005, pp. 1-15.*

Marais et al., "Supporting Cooperative and Personal Surfing with a Desktop Assistant", Proceedings of the ACM Symposium on User Interface Software and Technology, 10th Annual Symposium, UIST '97, Banff, Alberta, Canada, 1997, pp. 129-138.

Sizov et al., "BINGO!: Bookmark-Induced Gathering of Information", Proceedings of the 3rd International Conference on Web Information Systems Engineering (WISE'02), IEEE, 2002, 10 pages.

Chakrabarti et al., "Using Memex to archive and mine community Web browsing experience", http://www9.org/w9cdrom/98/98.html, pp. 1-22.

Mori et al., "Bookmark-Agent: Sharing of Bookmarks for Search Assists", Transactions of the Institute of Electronics, Information and Communication Engineers D-I, vol. J83-D-a, No. 5, May 2000, pp. 449-512.

Mizoguchi et al., "Discovery of shared topics networks among people. A simple approach to find community knowledge from WWW bookmarks", PRICAI 2000, 6th Pacific Rim International Conference on Artificial Intelligence, Proceedings (Lecture Notes in Artificial Intelligence vol. 1886), 2000, Abstract, 1 page.

* cited by examiner

CUSTOMIZED AND CONSOLIDATED BOOKMARKS

BACKGROUND OF THE INVENTION

1. Technical Field

The present invention relates generally to bookmarks. Still more particularly, the present invention provides bookmarks that are customized and consolidated into folders as defined in an Instant Messaging (IM) environment and shared with an Internet browser.

2. Description of Related Art

Instant messaging (sometimes called IM or IMing) is the ability to easily see whether a chosen friend or co-worker is connected to the Internet and, if they are, to exchange messages with them. Instant messaging differs from ordinary e-mail in the immediacy of the message exchange and also makes a continued exchange simpler than sending e-mail back and forth. Most exchanges are text-only. However, some services allow attachments or other features.

In order for IMing to work, both users (who must subscribe to the service) must be online at the same time, and the intended recipient must be willing to accept instant messages. It is possible to set your software to reject messages. An attempt to send an IM to someone who is not online, or who is not willing to accept IMs, will result in notification that the transmission cannot be completed. If the online software is set to accept IMs, it alerts the recipient with a distinctive sound, a window that indicates that an IM has arrived and allowing the recipient to accept or reject it, or a window containing the incoming message.

Under most conditions, IMing is truly "instant." Even during peak Internet usage periods, the delay is rarely more than a second or two. It is possible for two people to have a real-time online "conversation" by IMing each other back and forth.

IMing provides another method to stay in contact with customers, friends, colleagues, etc. The IM tool can be used to answer support questions and even to pull or push content (URLs or Web pages). However, performing searches of the Web may require significant time to find the requested information.

Thus, it would be advantageous to have a priority based Instant Messaging system that allows a user to contact colleagues or subject matter experts (SME). These contacts may have online information, such as Web searches or bookmarks, which can be accessed by the user and would reduce Web search time.

SUMMARY OF THE INVENTION

The present invention provides a method, apparatus, and computer program product for customizing and consolidating bookmarks into folders in an Instant Messaging (IM) environment as well as an Internet browser. The exemplary aspect of the present invention provides an IM GUI that contains IM contacts and online information for those IM contacts, such as Web searches or bookmarks, which can be accessed by the user. The present invention allows for sorting of the IM contacts by a specific subject matter or category. The present invention also allows for prioritizing of IM contacts based on subject matter expertise or frequently visited bookmarks. The present invention also allows for searching of information contained in the IM environment as well as the Internet.

BRIEF DESCRIPTION OF THE DRAWINGS

The novel features believed characteristic of the invention are set forth in the appended claims. The invention itself, however, as well as an illustrative mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
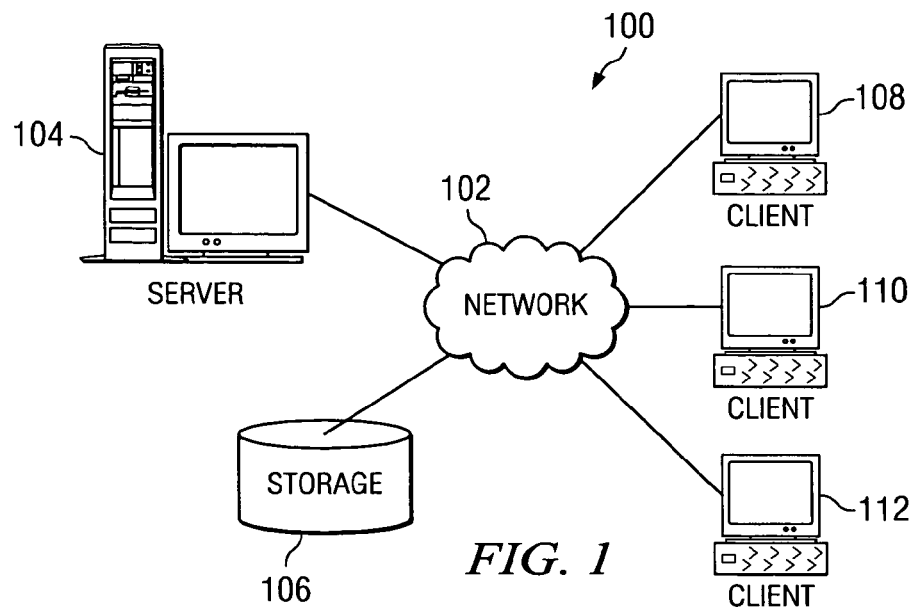
FIG. 1 is a pictorial representation of a network of data processing systems in which the present invention may be implemented.
Figure 2:
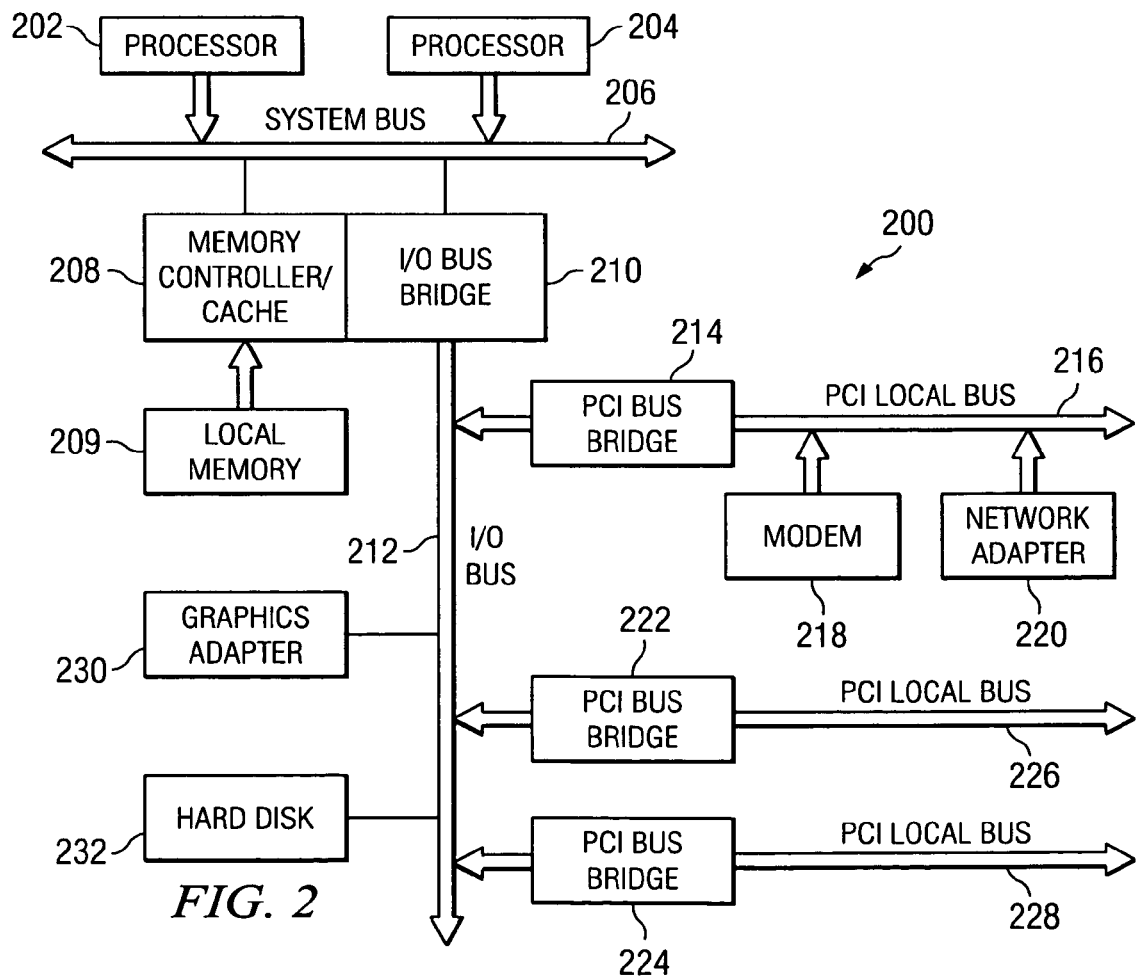
FIG. 2 is a block diagram of a data processing system that may be implemented as a server in accordance with an illustrative embodiment of the present invention.
Figure 3:
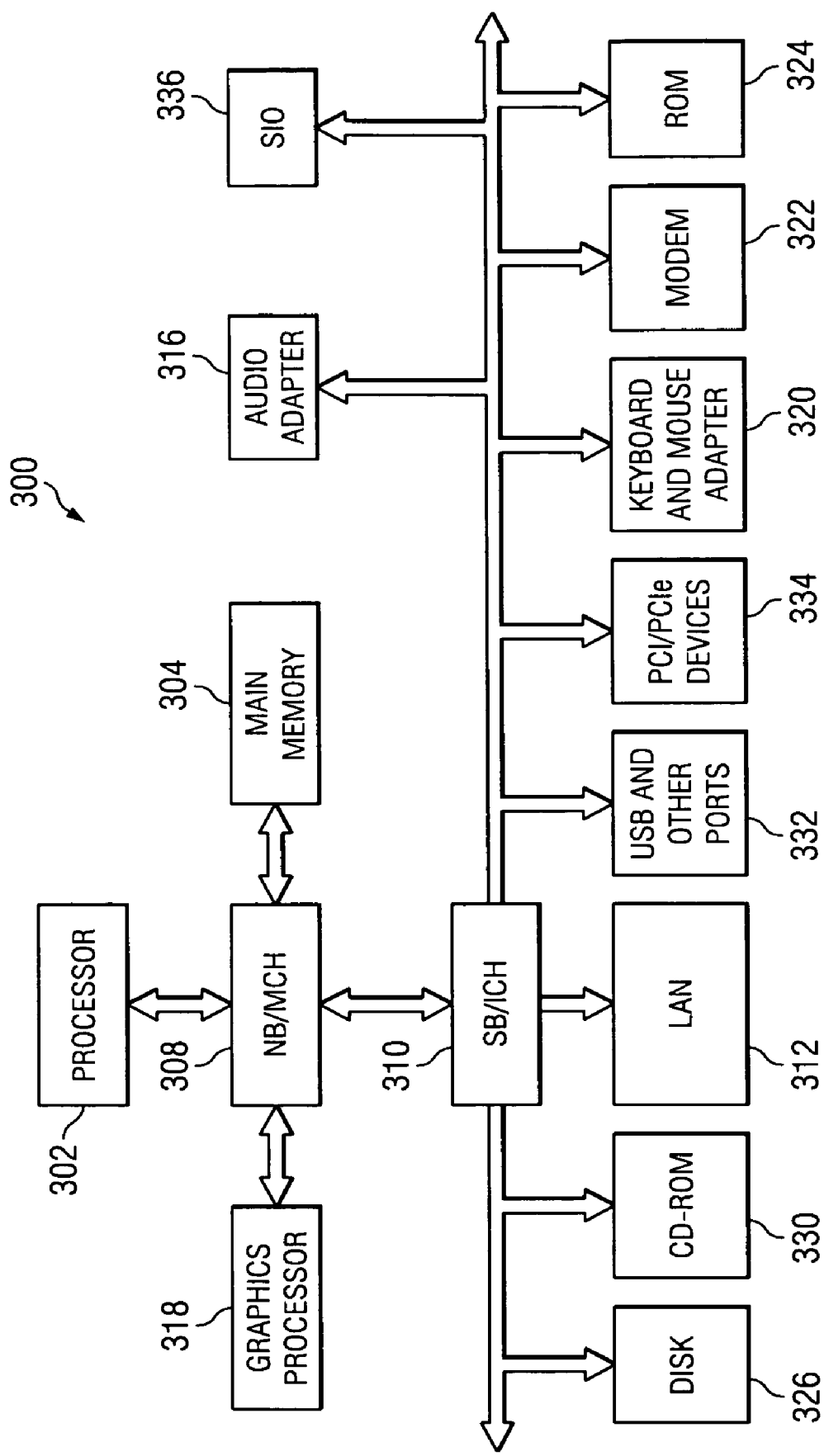
FIG. 3 is a block diagram of a data processing system in which the present invention may be implemented.

The present invention provides a method, apparatus, and computer program product for customizing and consolidating bookmarks in an IM environment. The data processing device may be a stand-alone computing device or may be a distributed data processing system in which multiple computing devices are utilized to perform various aspects of the present invention. Therefore, the following FIGS. 1-3 are provided as exemplary diagrams of data processing environments in which the present invention may be implemented. It should be appreciated that FIGS. 1-3 are only exemplary and are not intended to assert or imply any limitation with regard to the environments in which the present invention may be implemented. Many modifications to the depicted environments may be made without departing from the spirit and scope of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In accordance with an illustrative embodiment of the present invention, server 104 provides application integration tools to application developers for applications that are used on clients 108, 110, and 112. More particularly, server 104 may provide access to application integration tools that will allow two different front-end applications in two different formats to disseminate messages sent from each other.

In accordance with one illustrative embodiment, a dynamic framework is provided for using a graphical user interface (GUI) for creating and editing message formats. This framework involves the development of user interface (UI) components for message data elements in the visualization and building of message formats, which may exist on storage 106. This framework may be provided through an editor mechanism on server 104 in the depicted example. The UI components and message data elements may be accessed, for example, using a browser client application on one of clients 108, 110, and 112.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with an illustrative embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® system, a product of International Business Machines Corporation in Armonk, N.Y., running the Advanced Interactive Executive (AIX™) operating system or LINUX® operating system.

With reference now to FIG. 3, a block diagram of a data processing system is shown in which the present invention may be implemented. Data processing system 300 is an example of a computer, such as client 108 in FIG. 1, in which code or instructions implementing the processes of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 may be connected to ICH 310. PCI/PCIe devices may include, for example, Ethernet adapters, add-in cards, PC cards for notebook computers, etc. PCI uses a cardbus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and is used to coordinate and provide control of various components within data processing system 300 in FIG. 3. The operating system may be a commercially available operating system such as Windows XP™, which is available from Microsoft Corporation. An object oriented programming system, such as the Java™ programming system, may run in conjunction with the operating system and provides calls to the operating system from Java™ programs or applications executing on data processing system 300. "JAVA" is a trademark of Sun Microsystems, Inc.

Instructions for the operating system, the object-oriented programming system, and applications or programs are located on storage devices, such as hard disk drive 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330.

Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the present invention may be applied to a multiprocessor data processing system.

For example, data processing system 300 may be a personal digital assistant (PDA), which is configured with flash memory to provide non-volatile memory for storing operating system files and/or user-generated data. The depicted example in FIG. 3 and above-described examples are not meant to imply architectural limitations. For example, data processing system 300 also may be a tablet computer, laptop computer, or telephone device in addition to taking the form of a PDA.

The present invention provides for customizing and consolidating bookmarks into folders in an Instant Messaging (IM) environment as well as an Internet browser. An IM GUI is provided that contains IM contacts and online information for those IM contacts, such as Web searches or bookmarks, which can be accessed by the user. The IM contacts in the IM GUI may be sorted by a specific subject matter or category as well as prioritizing of the IM contacts based on subject matter expertise or frequently visited bookmarks. Finally, the information contained in the IM environment may be searched in addition to further searches of the Internet.

Figure 4:
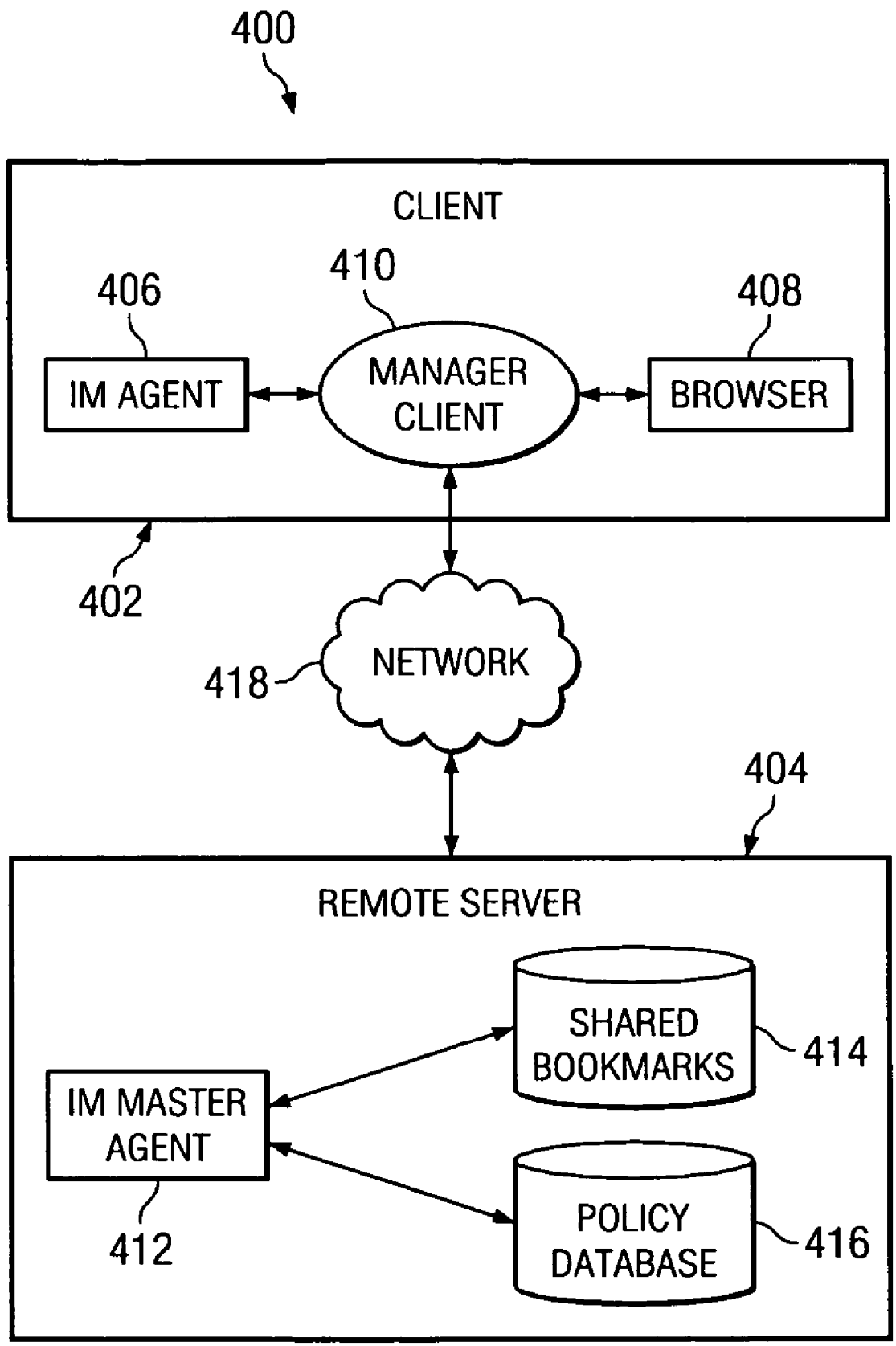
FIG. 4 is a functional block diagram of an instant messaging system in accordance with an illustrative embodiment of the present invention.

Turning now to FIG. 4, a functional block diagram of an Instant Messaging system is depicted in accordance with an illustrative embodiment of the present invention. IM system 400 is comprised of a client 402, which is similar to client 108 of FIG. 1, and remote server 404, which is similar to server 104 of FIG. 1. In this example, client 402 is comprised of an IM agent 406, browser 408, and client manager 410. Remote server 404 is comprised of IM master agent 412, shared bookmark database 414 and policy database 416. Upon initiation of IM agent 406, client manager 410 communicates with IM master agent 412, through network 418. As IM agent 406 initializes, the information for the IM contacts contained in IM agent 406 is updated based on the information stored in shared bookmarks database 414. This update may be in the form of a synchronization preformed with shared bookmarks database 414 and IM agent 406. Synchronization of IM agent 406 also may occur at other time other than initialization, such as synchronization at time specified by user settings.

After IM agent 406 has completed initialization, a user may then perform any number of functions that are provided by IM agent 406. One such exemplary function is the selection of a bookmark that is associated with an IM contact. If a user selects a bookmark, then client manager 410 initiates browser 408 and a browser session. The selected bookmark is then retrieved from network 418 and displayed in browser 408.

Additionally, if a user wishes to add an IM contact to IM agent 406, client manager 410 sends a request to IM master agent 412. IM master agent 412 first checks policy database 416 to determine if permission or privilege has already been granted to add the IM contact to IM agent 406 of client 402. If a permission or privilege does not exist, then the request is forwarded to the IM agent of the requested IM contact for permission or privilege. Whether permission already exists or permission is granted based on a request sent to the requested IM contact, the shared bookmarks stored in the contact's portion of shared bookmark database 414 are then downloaded to the user's portion of shared bookmarks database 414. Subsequently, the information for the newly added IM contact contained in IM agent 406 is updated based on the information stored in shared bookmarks database 414. This update may be in the form of a synchronization preformed with shared bookmarks database 414 and IM agent 406. Synchronization of IM agent 406 also may occur at other times other than the addition of a new contact, such as synchronization at initialization or that specified by user settings. If a user wishes to delete an IM contact, the deletion will be immediate on IM agent 406; however, in these illustrative examples, the deletion will only be made on the IM master agent 412 at the next synchronization. Additional features of IM agent 406 will be discussed in the following Figures.

Figure 5:
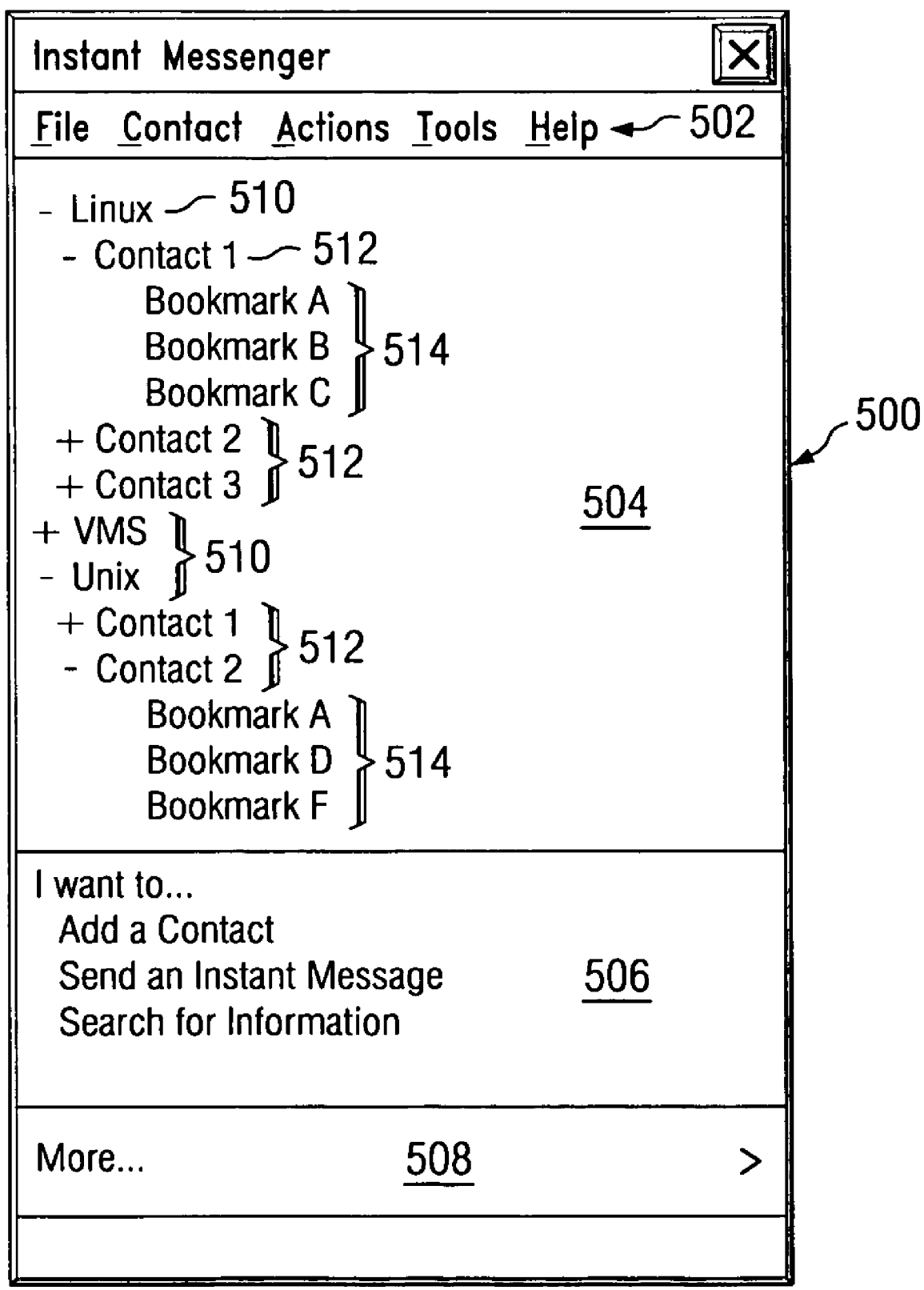
FIG. 5 is an exemplary graphical user interface (GUI) for an instant messaging agent in accordance with an illustrative embodiment of the present invention.

FIG. 5 is an exemplary graphical user interface (GUI) for an instant messaging agent in accordance with an illustrative embodiment of the present invention. Window 500 is an example of a GUI that may be implemented in IM agent 406 of FIG. 4. Window 500 consists of a tool bar 502, contact area 504, shortcut area 506, and additional feature area 508. Tool bar 502 provides a user with the tools that are available to operate window 500. Some exemplary items shown to be part of tool bar 502 are "File", "Contact", "Actions", "Tools", and "Help". Although the present invention only depicts these tools, one of ordinary skill in the art would realize other features may be provided.

Contact area 504 shows that contacts 512 are sorted by category headers 510. The exemplary categories of category headers 510 are shown as Linux®, VMS™, and Unix®, although any category may be used to categorize contacts 512. Contact area 504 also shows the bookmark(s) 514 that are associated with each contact 512. Bookmark 514 is a mark of a Web document or a specific place in a Web document used for later retrieval. Nearly all Web browsers support a bookmarking feature that saves the address (URL) of a Web page so that the Web page may be easily re-visited at a later time. The addition of a contact 512 and being able to view bookmark(s) 514 will be described in FIG. 7.

Shortcut area 506 provides shortcuts to features that are available through window 500. Exemplary features shown in FIG. 5 are to add a contact, send an instant message, and search for information in the bookmarks of other contacts. Although some of these exemplary features are common to other known IM agents, an illustrative embodiment of the present invention is to provide a searching agent that allows a user to search contact's bookmarks and/or the Internet for information. Searching for information will be described in FIGS. 8 and 9. Window 500 also contains an additional feature area 508 where a drop down menu may be accessed to gain access to additional features that are available to a user.

Figure 6:
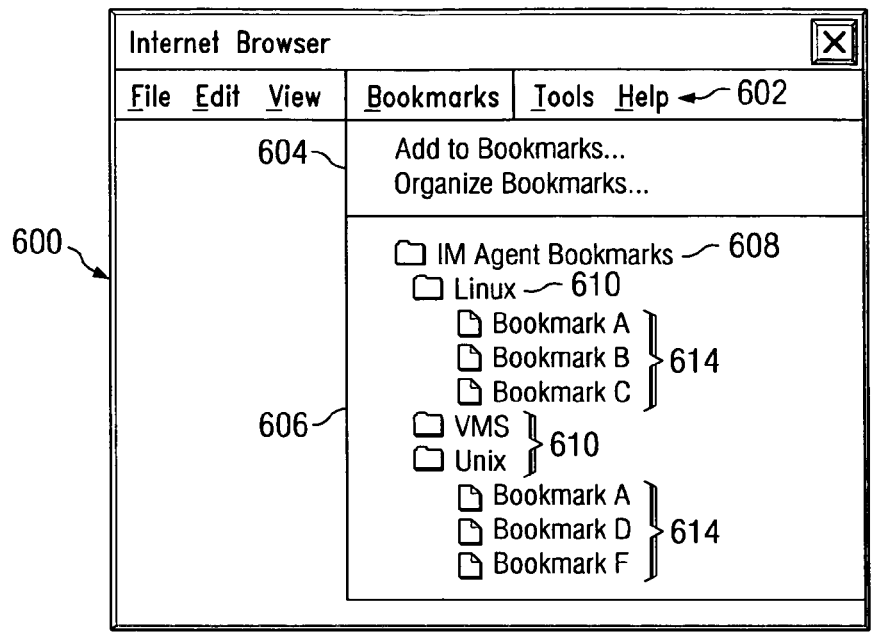
FIG. 6 is an exemplary internet browser in accordance with an illustrative embodiment of the present invention.

In FIG. 6, an exemplary internet browser is depicted in accordance with an illustrative embodiment of the present invention. Browser 600 is an example of a browser that may be implemented in browser 408 of FIG. 4. Browser 600 consists of a tool bar 602, utility area 604, and bookmark area 606. Tool bar 602 provides a user with the tools that are available to operate browser 600. Some exemplary items shown to be part of tool bar 602 are "File", "Edit", "View", "Bookmarks", "Tools", and "Help". Although the present invention only depicts these tools, one of ordinary skill in the art would realize other features may be provided.

Utility area 604 shows that bookmarks contained in browser 600 may either be added or organized. Bookmark area 606 shows that bookmarks 614 are sorted by category headers 610. The exemplary categories headers 610 are shown as Linux®, VMS™, and Unix®, although any category may be used to categorize bookmarks 614. Bookmark area 606 also shows exemplary bookmark(s) 614 that are associated with each category 610. Bookmark(s) 614 are marks of a Web documents or a specific places in a Web document used for later retrieval. Nearly all Web browsers support a bookmarking feature that saves the address (URL) of a Web page so that the Web page may be easily re-visited at a later time. The addition of a category 610 and being able to view bookmark(s) 614 will be described in FIG. 7.

As an illustrative embodiment of the present invention, both IM agent window 500 of FIG. 5 and Internet browser 600 of FIG. 6 use the same bookmarks that are stored in client manager 410 of FIG. 4. Notably in browser 600 is the exclusion of sorting of bookmarks by contacts 512 as shown in FIG. 5. This illustrative embodiment is only one aspect of the present invention, in that internet browser 600 is configured in such a way that only bookmarks 614 are sorted by category 610 rather than an additional layer of sorting by contact, although sorting by contact may also be provided in another aspect of the present invention. Client manager 410 of FIG. 4 would store the bookmarks in subdirectories of category 510 and contact 512 which would be displayed in IM agent window 500 of FIG. 5. However, the subdirectory of contact 512 may be omitted in displaying the bookmarks in bookmarks area 606 of browser 600 if contacts 512 do not have any shared bookmarks.

Figure 7:
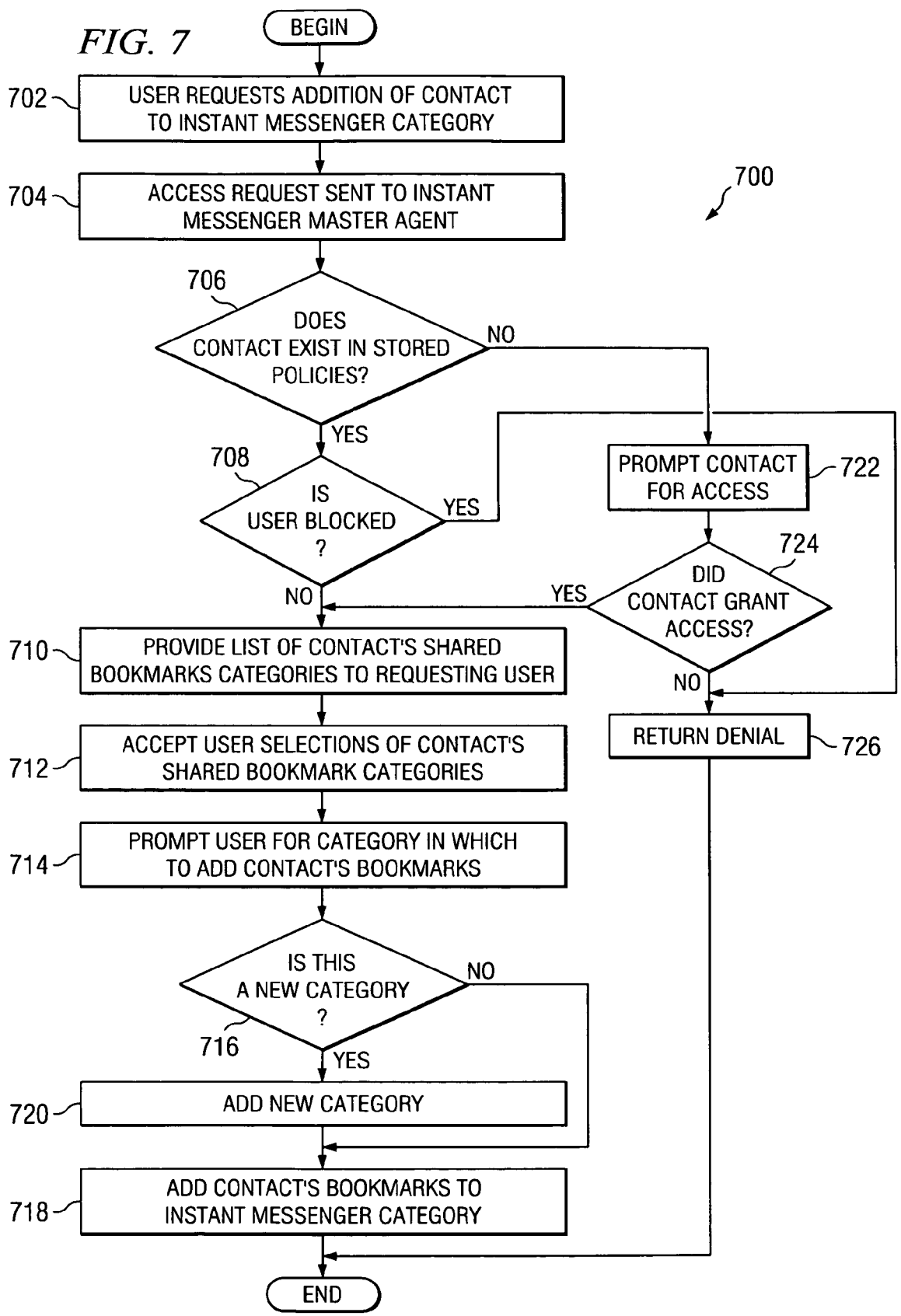
FIG. 7 is a flowchart illustrating an exemplary operation of adding a contact to an IM agent in accordance with an illustrative embodiment of the present invention.

In FIG. 7, flowchart 700 illustrates an exemplary operation of adding a contact to an IM agent in accordance with an illustrative embodiment of the present invention. As the operation begins a user requests the addition of a set of contacts to an IM category within a user's IM agent (step 702). The set of contacts may be one contact or a plurality of contacts. The request for access is sent by the user's IM agent to the IM master agent (step 704). Once the request is received by the IM master at a remote server, the IM master agent determines if the requested contact has a policy stored within the policy database residing at the remote server (step 706). The policy database contains the policies that are set by individual contacts as to those persons the contacts wishes to share information with or has blocked. The policy database also stores the permissions or privileges for all bookmarks associated with the contact. The contact controls through these permissions and privileges the individual bookmarks that the contact wishes to share with each user. Additionally, the policy database stores the permissions and privileges for the rating for each bookmark that is stored by the contact as to the number of times each bookmark has been accessed. These ratings may or may not be shared with the user requesting access depending on the permissions or privileges the contact sets. The actual bookmarks and bookmark ratings for the contact is stored in a shared bookmarks database in the remote server.

Returning to step 706, if the policy database contains information regarding the contact and the specific user, the policies are checked to determine if the user requesting access is specified within the particular contacts permissions or privileges. If so, the IM master agent determines if the user is blocked (step 708). If the user is not blocked, the user is provided a list of the bookmark categories that are shared by the contact (step 710). The bookmark categories contain a set of bookmarks that the contact has added to the categories. The set of bookmarks may be one bookmark or a plurality of bookmarks that the contact has authorized the user to view. It is an alternative aspect of this illustrative embodiment that an option may be provided to the contact where the contact may only wish to be added as a contact and not share any bookmarks. In this alternative embodiment, the user would not be provided with a list of the bookmark categories that are shared by the contact. However, if the contact has authorized bookmarks that are to be shared, the user then selects the shared bookmark categories from the contact, which are accepted by the IM agent (step 712).

The user is then prompted by the IM agent as to the category in which the user wants the selected bookmarks to be placed (step 714). The IM agent detects whether the category provided by the user is a new category or an existing one (step 716). If the category is an existing category, the contacts bookmarks are added to the user's IM category (step 718). If at step 716, the category is a new category, the new category is added to the IM agent (step 720) and then the contacts bookmarks are added to the user's IM category (step 718). As described previously with respect to FIG. 4, once the contact is added to the IM agent, synchronization of the IM agent with that of the shared bookmarks of the contact is performed as well as any additional modification or deletion the user has made to the IM agent. Returning to step 708, if the user is blocked by the contact, a denial is returned to the user (step 726) with the operation ending thereafter.

Returning to step 706, if the policy database contains information about the specific contact but not the specific user, a prompt is sent to the contact requesting access be granted by the contact to the user (step 722). If the contact grants access (step 724), the operation proceeds to step 710 where the user is provided a list of the bookmark categories that are shared by the contact and continues as described previously. Returning to step 724, if the contact does not grant access, a denial is returned to the user (step 726) with the operation ending thereafter.

Figure 8:
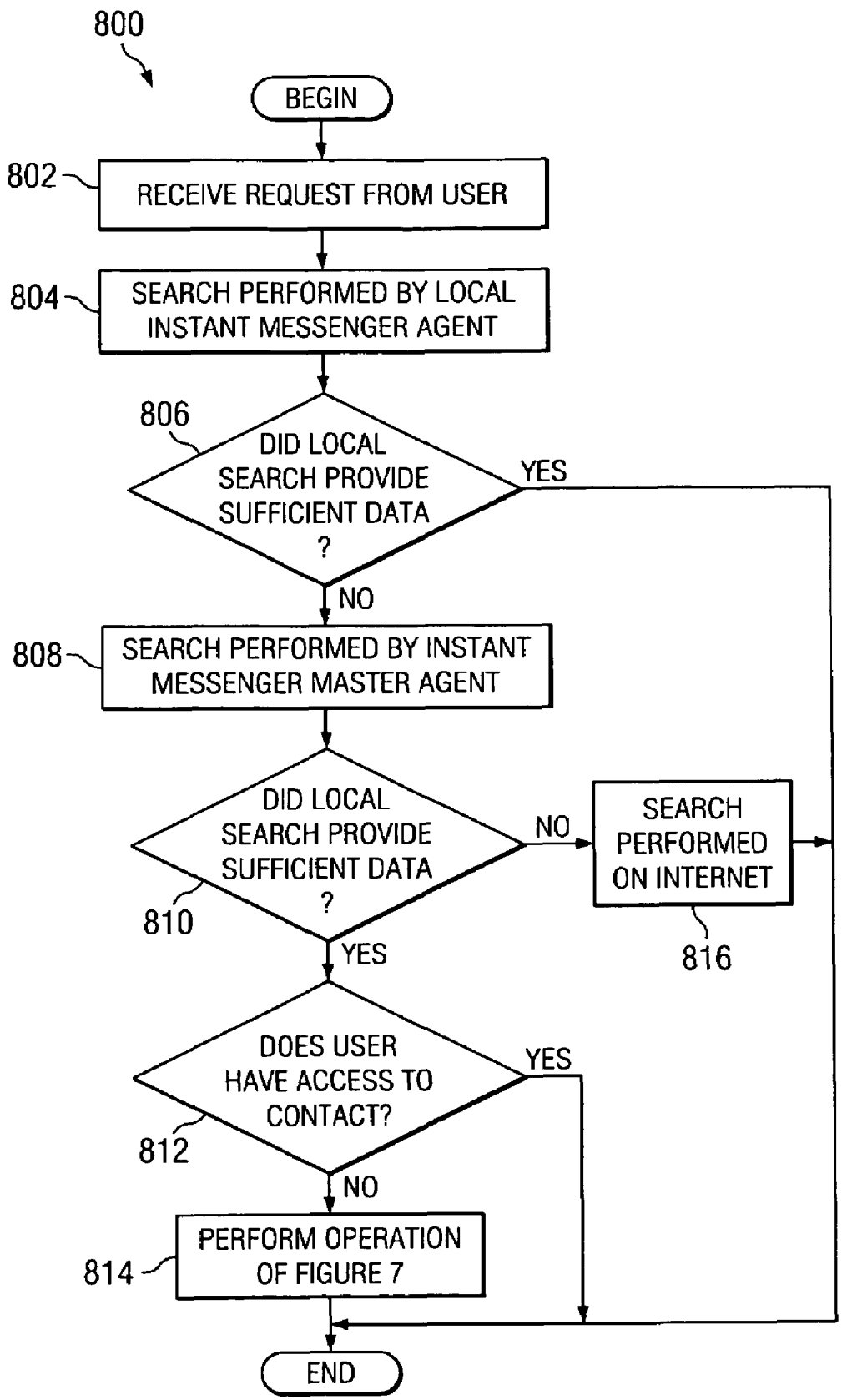
FIG. 8 is a flowchart illustrating an exemplary operation of searching for information on a local agent and the Internet in accordance with an illustrative embodiment of the present invention.

Turning now to FIG. 8, flowchart 800 illustrates an exemplary operation of searching for information on a local agent and the Internet in accordance with an illustrative embodiment of the present invention. As the operation begins, a user request is received to search for information on a particular subject (step 802). The search request contains a set of parameters that are used by a search engine to search the contacts and bookmarks that are already contained on the user's IM agent (step 804). Results related to the search request are returned to the user. These results may be compared to the search request parameters through the use of percentages. Such a comparison is comparable to search engine techniques known to those of ordinary skill in the art, although other techniques may be employed. Then, a prompt is provided to the user to determine if the information returned in the search suffices the user's request (step 806). If the answer to the prompt is yes, the operation ends.

In an illustrative embodiment of the present invention, an exemplary search would be if the user would like to find information in the field of Linux® and pertaining to instant messaging. Thus the parameters provided in the search request would be Linux® and instant messaging. Then the search engine would search all of the contacts and bookmarks located in the user's IM agent for any contact or bookmark that contains information related to Linux® and instant messaging. If a contact shows to be a Linux® expert but has no instant messaging information his information would be returned with 50 percent relevance. Likewise if a bookmark is found to contain a Linux® reference as well as an instant messaging, the bookmark would be returned with 100 percent relevance.

Returning to step 806, if the answer to the prompt is no, then a search request is performed by the search engine, using the set of parameters provided by the user, on the information stored at the IM master agent and the shared bookmarks database (step 808). Results related to this search are returned to the user. These results may be compared to the search request parameters through the use of percentages. Once again a prompt is provided to the user to determine if the information returned in the search sufficed the user's request (step 810). If the answer to the prompt is yes, a determination is made as to whether the user has access to the contact and the contact's bookmarked information (step 812). If the user has access, then the operation ends. If the user does not have access, then the operation proceeds as described in FIG. 7

(step 814). Returning to step 810, if the answer to the prompt is no, then a search request is performed by the search engine, using the set of parameters provided by the user, on the Internet (step 816) then the operation ends. Results related to this search are returned to the user. These results may be compared to the search request parameters through the use of percentages.

Figure 9:
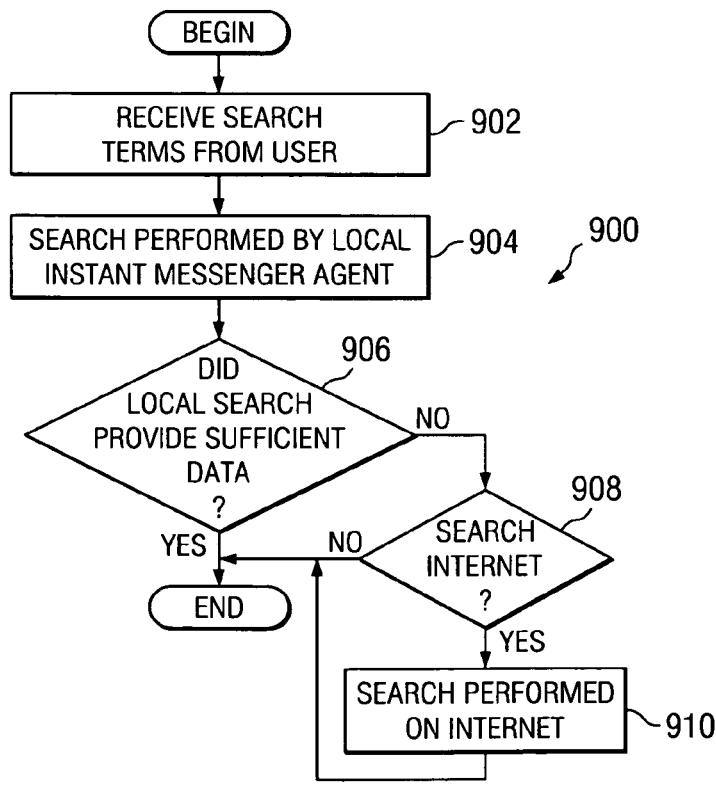
FIG. 9 is a flowchart illustrating an exemplary operation of an expanded search for information on a local agent and the Internet to include searching a master agent in accordance with an illustrative embodiment of the present invention.

Turning now to FIG. 9, flowchart 900 illustrates an exemplary operation of an expanded search for information on a local agent and the Internet of FIG. 8 to include searching a master agent in accordance with an illustrative embodiment of the present invention. As the operation begins, a user request is received that defines the search terms, which are to be used to search the user's contact bookmarks (step 902). The user request contains a set of terms that are used by a search engine to search the contacts' bookmarks that are already contained on the user's IM agent (step 904). Results related to the search request are returned to the user. These results may be compared to the search request parameters through the use of percentages. Such a comparison is comparable to search engine techniques known to those of ordinary skill in the art, although other techniques may be employed. Then, a prompt is provided to the user to determine if the information returned in the search suffices the user's request (step 906). If the answer to the prompt is yes, the operation ends.

Returning to step 906, if the answer to the prompt is no, then the user is prompted to see if the user wants to search the Internet using the search terms defined in the user's original request (step 908). If the user indicates that a search of the Internet is appropriate, then a search request is performed by the search engine, using the search terms provided by the user, on the Internet (step 910). Results related to this search are returned to the user. These results may be compared to the search request parameters through the use of percentages. Returning to step 908, if the user does not indicate that a search of the Internet is appropriate, then the operation ends.

Thus, the present invention provides for customizing and consolidating bookmarks into folders in an Instant Messaging (IM) environment as well as an Internet browser. The provided IM GUI contains IM contacts and online information for those IM contacts, such as Web searches or bookmarks, which can be accessed by the user. The IM contacts in the IM GUI may be sorted by a specific subject matter or category as well as prioritizing of the IM contacts based on subject matter expertise or frequently visited bookmarks. Finally, the information contained in the IM environment may be searched in addition to further searches of the Internet.

The present invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for customizing and consolidating bookmarks, the method comprising:

receiving a request from a requesting user to add a set of contacts to a local agent, wherein the requesting user specifies specific contacts to include in the set of contacts using a graphical user interface;

in response to receiving the request, determining whether the set of contacts is authorized by the set of contacts to be added to the local agent, wherein each of the specific contacts in the set of contacts sets policies for sharing bookmarks that are owned by the specific contacts, wherein the policies determine permissions and privileges associated with the bookmarks assigned to specific users, wherein a specific contact in the set of contacts assigns different permissions and privileges for an individual bookmark to a first specific user than to a second specific user, and wherein the individual bookmark is shared with the first specific user and the individual bookmark is not shared with the second specific user;

in response to determining that the set of contacts is authorized to be added to the local agent, providing a plurality of bookmarks associated with the set of contacts to the requesting user based on determined permissions and privileges associated with the bookmarks assigned to the requesting user, wherein each contact in the set of contacts is an Instant Messaging contact, the providing step further comprising;

displaying, on a display device, bookmark categories of the set of contacts, wherein each of the bookmark categories contain a set of bookmarks added by the specific contact in the set of contacts; and prompting the requesting user for a category in which to add the set of contacts, wherein the category indicates a specific subject matter for a selection of at least one set of bookmarks;

receiving the selection of the at least one set of bookmarks from the plurality of bookmarks that correspond to the category and are associated with the set of contacts, wherein the requesting user selects desired bookmark categories from the set of contacts that correspond to the category to form the selection of the at least one set of bookmarks using the graphical user interface; and adding the set of contacts and the selection of the at least one set of bookmarks to the category on the local agent for the requesting user, wherein the local agent is an Instant Messaging agent and the requesting user is an Instant Messaging user of the Instant Messaging agent.

2. The method of claim 1, further comprising:
determining if the category is an existing category; and
in response to the category being an existing category, adding the set of contacts and the selection of the at least one set of bookmarks to the category.

3. The method of claim 2, further comprising:
in response to the category not being an existing category, creating a new category; and
adding the set of contacts and the selection of the at least one set of bookmarks to the new category.

4. The method of claim 1, wherein the set of contacts, the selection of the at least one set of bookmarks, and category are stored as stored information in a requesting user's data structure at the local agent and a master agent, and wherein the master agent is an Instant Messaging agent.

5. The method of claim 4, wherein initialization of the local agent synchronizes the stored information in the requesting user's data structure at the local agent with the stored information at the master agent. agent.

6. The method of claim 5, wherein the local agent sorts and displays the stored information based on the category, wherein the local agent displays the set of contacts associated with the selection of the at least one set of bookmarks, wherein the local agent displays a rating that the set of contacts has associated with the selection of the at least one set of bookmarks, and wherein the local agent displays a rating for the requesting user's access to the selection of the at least one set of bookmarks.

7. The method of claim 1, wherein the local agent stores the set of contacts, the selection of the at least one set of bookmarks, and the category in a data structure, and wherein an Internet browser uses the stored information to display the selection of the at least one set of bookmarks in the Internet browser.

8. The method of claim 1, further comprising:
in response to determining that the set of contacts is unauthorized to be added to the local agent, prompting the set of contacts to authorize access using a plurality of Instant Messaging agents;
receiving an authorization response or denial response from the set of contacts;
in response to receiving a denial response from the set of contacts, sending an error message to the requesting user; and
in response to receiving an authorization response from the set of contacts, granting authorization to add the set of contacts to the local agent.

9. The method of claim 1, wherein determining that the set of contacts is authorized to be added to the local agent comprises:
searching a data structure for authorization information;
determining if the requesting user is recorded in the data structure;
in response to the requesting user being recorded in the data structure, determining if the requesting user is blocked from authorization based on information in the data structure; and
in response to the requesting user not being blocked from authorization, granting authorization to add the set of contacts.

10. The method of claim 1, further comprising:
receiving a request from the requesting user to search for a particular subject matter;
searching the local agent for first subject matter results related to the requested particular subject matter using stored contacts and bookmarks for the requesting user on the local agent; and
returning the first subject matter results to the requesting user.

11. The method of claim 10, further comprising:
prompting the requesting user for first user input to determine if the first subject matter results provide sufficient information;
in response to the first subject matter results not providing sufficient information, searching a remote source for second subject matter results related to the requested particular subject matter; and
returning the second subject matter results to the requesting user.

12. The method of claim 11, further comprising:
prompting the requesting user to determine if the second subject matter results provide sufficient information;
in response to the second subject matter results providing sufficient information, determining if the requesting user has privileges to access the second subject matter; and
in response to the requesting user not having sufficient privileges to access the second subject matter, requesting access from an owner of the second subject matter.

13. A data processing system comprising:
a bus system;
a communications system connected to the bus system;
a storage device connected to the bus system, wherein the storage device includes a set of instructions;
an instruction execution unit; and
a processing unit connected to the bus system, wherein the processing unit executes the set of instructions to receive a request from a requesting user to add a set of contacts to a local agent; wherein the requesting user specifies specific contacts to include in the set of contacts using a graphical user interface; determine whether the set of contacts is authorized by the set of contacts to be added to the local agent in response to receiving the request, wherein each of the specific contacts in the set of contacts sets policies for sharing bookmarks that are owned by the specific contacts, wherein the policies determine permissions and privileges associated with the bookmarks assigned to specific users, wherein a specific contact in the set of contacts assigns different permissions and privileges for an individual bookmark to a first specific user than to a second specific user, and wherein the individual bookmark is shared with the first specific user and the individual bookmark is not shared with the second specific user; provide the plurality of bookmarks associated with the set of contacts to the requesting user based on determined permissions and privileges associated with the bookmarks assigned to the requesting user in response to determining that the set of contacts is authorized to be added to the local, wherein each contact in the set of contacts is an Instant Messaging contact, wherein provide the plurality of bookmarks further comprises: display bookmark categories of the set of contacts, wherein each of the bookmark categories contain a set of bookmarks added by the specific contact in the set of contacts; and prompt the requesting user for a category in which to add the set of contacts, wherein the category indicates a specific subject matter for a selection of at least one set of bookmarks; receive the selection of the at least one set of bookmarks from the plurality of bookmarks that correspond to the category and are associated with the set of contacts, wherein the requesting user selects desired bookmark categories from the set of contacts that correspond to the category to form the selection of the at least one set of bookmarks using the graphical user interface; and add the set of contacts and selection of the set of bookmarks to the category on the local agent for the requesting user, wherein the local agent is an Instant Messaging agent and the requesting user is an Instant Messaging user of the Instant Messaging agent.

14. The data processing system of claim 13, wherein the processing unit further executes a set of instructions to determine if the category is an existing category; and add the set of contacts and the selection of the set of bookmarks to category in response to the category being an existing category.

15. The data processing system of claim 13, wherein the processing unit further executes a set of instructions to prompt the set of contacts to authorize access in response to determining that the set of contacts is unauthorized to be added to the local using a plurality of Instant Messaging agents; receive an authorization response or denial response from the set of contacts; send an error message to the requesting user in response to receiving a denial response from the set of contacts; and grant authorization to add the set of contacts to the local agent in response to receiving an authorization response from the set of contacts.

16. The data processing system of claim 13, wherein the processing unit further executes a set of instructions to receive a request from the requesting user to search for a particular subject matter; search the local agent for first subject matter results related to the requested particular subject matter using stored contacts and bookmarks for the requesting user on the local agent; and return the first subject matter results to the requesting user.

17. A computer program product comprising:
a computer readable storage medium including computer usable program code encoded thereon executed on a computer for customizing and consolidating bookmarks, said computer program product including:
computer usable program code for receiving a request from a requesting user to add a set of contacts to a local agent, wherein the requesting user specifies specific contacts to include in the set of contacts using a graphical user interface;
computer usable program code for determining whether the set of contacts is authorized by the set of contacts to be added to the local agent in response to receiving the request, wherein each of the specific contacts in the set of contacts sets policies for sharing bookmarks that are owned by the specific contacts, wherein the policies determine permissions and privileges associated with the bookmarks assigned to specific users, wherein a specific contact in the set of contacts assigns different permissions and privileges for an individual bookmark to a first specific user than to a second specific user, and wherein the individual bookmark is shared with the first specific user and the individual bookmark is not shared with the second specific user;
computer usable program code for providing the plurality of bookmarks associated with the set of contacts to the requesting user based on determined permissions and privileges associated with the bookmarks assigned to the requesting user in response to determining that the set of contacts is authorized to be added to the local agent, wherein each contact in the set of contacts is an Instant Messaging contact, the computer usable program code for providing the plurality of bookmarks further comprising:
computer usable program code for displaying bookmark categories of the set of contacts, wherein each of the bookmark categories contain a set of bookmarks added by the specific contact in the set of contacts; and
computer usable program code for prompting the requesting user for a category in which to add the set of contacts, wherein the category indicates a specific subject matter for a selection of at least one set of bookmarks;
computer usable program code for receiving the selection of the at least one set of bookmarks from the plurality of bookmarks that correspond to the category and are associated with the set of contacts, wherein the requesting user selects desired bookmark categories from the set of contacts that correspond to the category to form the selection of the at least one set of bookmarks using the graphical user interface; and
computer usable program code for adding the set of contacts and the selection of the at least one set of bookmarks to the category on the local agent for the requesting user, wherein the local agent is an Instant Messaging agent and the requesting user is an Instant Messaging user of the Instant Messaging agent.

18. The computer program product of claim 17, further comprising:
computer usable program code for determining if the category is an existing category; and
computer usable program code for adding the set of contacts and the selection of the at least one set of bookmarks to the category in response to the category being an existing category.

19. The computer program product of claim 17, further comprising:
computer usable program code for prompting the set of contacts to authorize access in response to determining that the set of contacts is unauthorized to be added to the local agent using a plurality of Instant Messaging agents;
computer usable program code for receiving an authorization response or denial response from the set of contacts; and
computer usable program code for sending an error message to the requesting user in response to receiving a denial response from the set of contacts; and
computer usable program code for granting authorization to add the set of contacts to the local agent in response to receiving an authorization response from the set of contacts.

20. The computer program product of claim 17, further comprising:
computer usable program code for receiving a request from the requesting user to search for a particular subject matter;
computer usable program code for searching the local agent for first subject matter results related to the requested particular subject matter using stored contacts and bookmarks for the requesting user on the local agent; and
computer usable program code for returning the first subject matter results to the requesting user.

* * * * *